United States Patent
Kim et al.

(10) Patent No.: US 10,924,807 B2
(45) Date of Patent: Feb. 16, 2021

(54) DISPLAY DEVICE AND CONTROL METHOD THEREFOR

(71) Applicant: SAMSUNG ELECTRONICS CO., LTD., Suwon-si (KR)

(72) Inventors: Joo-hyun Kim, Suwon-si (KR); Yo-han Song, Suwon-si (KR); Dahhee Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 15/781,632

(22) PCT Filed: Dec. 22, 2016

(86) PCT No.: PCT/KR2016/015118
§ 371 (c)(1),
(2) Date: Jun. 5, 2018

(87) PCT Pub. No.: WO2017/111508
PCT Pub. Date: Jun. 29, 2017

(65) Prior Publication Data
US 2020/0267453 A1 Aug. 20, 2020

(30) Foreign Application Priority Data
Dec. 22, 2015 (KR) .................. 10-2015-0183957

(51) Int. Cl.
*H04N 21/478* (2011.01)
*H04N 21/431* (2011.01)
*H04N 21/482* (2011.01)

(52) U.S. Cl.
CPC ... *H04N 21/47815* (2013.01); *H04N 21/4312* (2013.01); *H04N 21/482* (2013.01)

(58) Field of Classification Search
None
See application file for complete search history.

(56) References Cited

U.S. PATENT DOCUMENTS 6,323,911 B1 * 11/2001 Schein .................. G06F 3/0481
348/552
7,071,997 B2 7/2006 Seo
(Continued)

FOREIGN PATENT DOCUMENTS

| JP | 10-136276 | 5/1998 |
| KR | 10-2004-0009171 | 1/2004 |

(Continued)

OTHER PUBLICATIONS

International Search Report dated Mar. 10, 2017 in corresponding International Patent Application No. PCT/KR2016/015118.
(Continued)

*Primary Examiner* — Fernando Alcon
(74) *Attorney, Agent, or Firm* — Staas & Halsey LLP

(57) ABSTRACT

Provided are a display device and a controlling method thereof. The control method for the present display device may comprise: displaying the broadcast content of a first channel; when a predetermined key of a user operation unit is selected while the broadcast content is displayed, determining at least one application related to the broadcast content; displaying a UI for selecting the at least one determined application; and when one of the at least one application included in the UI is selected, executing the selected application.

11 Claims, 12 Drawing Sheets

(56) References Cited

U.S. PATENT DOCUMENTS

| | | | |
|---|---|---|---|
| 7,594,246 B1* | 9/2009 | Billmaier | G06F 3/0482 725/37 |
| 7,840,979 B2* | 11/2010 | Poling, Jr. | H04N 7/17318 725/41 |
| 8,117,564 B2* | 2/2012 | Woods | H04N 21/47 715/850 |
| 8,296,798 B2 | 10/2012 | Lee | |
| 8,661,472 B1* | 2/2014 | Kardatzke | H04N 21/4622 725/48 |
| 9,807,471 B2 | 10/2017 | Kim et al. | |
| 2002/0184634 A1* | 12/2002 | Cooper | H04N 21/4622 725/51 |
| 2003/0001898 A1* | 1/2003 | Bernhardson | G06F 3/0481 715/786 |
| 2003/0001907 A1* | 1/2003 | Bergsten | H04N 21/4312 715/853 |
| 2003/0067557 A1 | 4/2003 | Seo | |
| 2006/0053470 A1* | 3/2006 | Colter | G06Q 30/0271 725/135 |
| 2007/0245399 A1* | 10/2007 | Espelien | H04N 21/84 725/133 |
| 2008/0074557 A1 | 3/2008 | Hong | |
| 2008/0235738 A1 | 9/2008 | Lee | |
| 2010/0157157 A1* | 6/2010 | Yi | G06F 3/0362 348/570 |
| 2012/0060187 A1 | 3/2012 | Moon et al. | |
| 2013/0013419 A1 | 1/2013 | Sim et al. | |
| 2014/0201675 A1 | 7/2014 | Joo et al. | |
| 2014/0310382 A1* | 10/2014 | Reza | H04N 21/6373 709/217 |
| 2015/0201235 A1* | 7/2015 | Ellis | H04N 21/8173 725/60 |
| 2015/0296273 A1 | 10/2015 | Kim et al. | |

FOREIGN PATENT DOCUMENTS

| | | |
|---|---|---|
| KR | 10-0421877 | 3/2004 |
| KR | 10-2005-0075549 | 7/2005 |
| KR | 10-2005-0123272 | 12/2005 |
| KR | 10-0873951 | 12/2008 |
| KR | 10-2012-0022490 | 3/2012 |
| KR | 10-1271665 | 6/2013 |
| KR | 10-2013-0117092 | 10/2013 |
| KR | 10-1332604 | 11/2013 |
| KR | 10-1348646 | 1/2014 |
| KR | 10-2015-0039923 | 4/2015 |
| KR | 10-2015-0118779 | 10/2015 |

OTHER PUBLICATIONS

Written Opinion of the International Search Authority dated Mar. 10, 2017 in corresponding International Patent Application No. PCT/KR2016/015118.

* cited by examiner

DISPLAY DEVICE AND CONTROL METHOD THEREFOR

CROSS-REFERENCE TO RELATED APPLICATIONS

This application is a National Phase Application under 35 U.S.C. § 371 of PCT International Patent Application No. PCT/KR2016/015118, filed Dec. 22, 2016 which claims the foreign priority benefit under 35 U.S.C. § 119 to Korean Patent Application No. 10-2015-0183957 filed Dec. 22, 2015, the contents of which are incorporated herein by reference.

TECHNICAL FIELD

The present disclosure relates to a display apparatus and a controlling method thereof, and more particularly to a display apparatus which may provide an application related to the broadcast content currently being broadcasted or a broadcast content of a similar channel by using four direction keys, and a controlling method thereof.

DESCRIPTION OF RELATED ART

A recent display apparatus (e.g., a digital TV) may receive a broadcast content from various sources. For example, a display apparatus may receive various broadcast contents from a terrestrial channel, a satellite channel, a cable channel and the like. In addition, the display apparatus may provide an application execution function in addition to the broadcast contents reception function. For example, a user may execute various applications such as a web application, a video call application, a game application and the like through a display apparatus. That is, recently, a user may enjoy broadcast contents of a number of channels and also execute various applications through a display apparatus.

However, current display apparatus still converts channel through an up/down key of a remote controller or through an electronic program guide (EPG). In addition, in order to execute additional application in a display apparatus, an access to an additional screen such as a home hub screen is required. That is, there is an inconvenience that in order for the current display apparatus to view a desired channel or execute an application, a number of key operations or screen changes are required to be performed.

DETAILED DESCRIPTION

Problem to be Solved

The purpose of an embodiment is to resolve the aforementioned problems, that is to provide a display apparatus in which a user may convert a channel or execute an application more conveniently and intuitively, and a controlling method thereof.

Means of Solving the Problems

According to an embodiment, there is provided a controlling method of a display apparatus including displaying a broadcast content of a first channel, in response to a predetermined key of a user operation unit being selected while the broadcast content is displayed, determining at least one application related to the broadcast content, and displaying a user interface (UI) which includes a plurality of channels arranged based on a first axis and the at least one application arranged based on a second axis, and in response to one of at least one application included in the UI being selected, executing the selected application.

The displaying the UI may include, in response to a predetermined button of the user operation unit being selected while the broadcast content is displayed, determining at least one application related to the broadcast content and a channel similar to the first channel.

The UI may include, at least one application related to a plurality of channels arranged based on a first axis and the broadcast content arranged based on a second axis, and a channel similar to the first channel.

The at least one application related to the broadcast content and the channel similar to the first channel may be arranged based on frequency of use.

The display apparatus may include a user operation unit which includes four direction keys, and there is provided the method including, in response to one of an up key and a down key being selected while a highlight is displayed on the broadcast content among the UI, moving the highlight to a direction corresponding to the selected key based on the first axis, and in response to one of a left key and a right key being selected while the highlight is displayed on the broadcast content among the UI, moving the highlight to a direction corresponding to the selected key based on the second axis.

The controlling method may include, in response to a predetermined time passing after a channel currently broadcasted through the UI is changed to a second channel, determining at least one application related to a broadcast content of the second channel and a channel similar to the second channel, and changing the UI to include at least one application related to a broadcast content of the second channel and a channel similar to the second channel.

The predetermined key is a left key or a right key among four direction keys of the user operation unit, and the controlling method may include in response to an up key or a down key among four direction keys of the user operation unit being selected, changing a channel to a direction corresponding to the selected key.

The executing may include determining whether the selected application is installed, in response to the selected application not being installed, displaying a UI which inquires whether to install the selected application, in response to an installation command of the selected application being input through the UI, downloading and installing the selected application from outside, and executing the installed application.

The executing may further include, determining a version of the selected application, in response to a version of the selected application not being a latest version, updating the selected application to a latest version, executing the application which is updated to a latest version, and outputting an informing message which notifies that the selected application has been updated to a latest version.

According to an embodiment, there is provided a display apparatus including a display configured to display a broadcast content of a first channel, a user operation unit configured to include a plurality of keys, and a processor configured to, in response to a predetermined key of a user operation unit being selected while the broadcast content is displayed, determine at least one application related to the broadcast content, control the display to display a UI which includes a plurality of channels arranged based on a first axis and at least one application arranged based on a second axis, and in response to one of at least one application included in the UI being selected, execute the selected application.

The processor, in response to a predetermined button of the user operation unit being selected while the broadcast content is displayed, may determine at least one application related to the broadcast content and a channel similar to the first channel.

The UI may include at least one application related to a plurality of channels arranged based on a first axis and the broadcast content arranged based on a second axis, and a channel similar to the first channel.

The at least one application related to the broadcast content and the channel similar to the first channel may be arranged based on frequency of use.

The user operation unit may include four direction keys, and the processor, in response to one of an up key and a down key being selected while a highlight is displayed on the broadcast content among the UI, control the display to move the highlight to a direction corresponding to the selected key based on the first axis, and in response to one of a left key and a right key being selected while the highlight is displayed on the broadcast content among the UI, control the display to move the highlight to a direction corresponding to the selected key based on the second axis.

The processor, in response to a predetermined time passing after a channel currently broadcasted through the UI is changed to a second channel, may determine at least one application related to a broadcast content of the second channel and a channel similar to the second channel, and control the display to change the UI to include at least one application related to a broadcast content of the second channel and a channel similar to the second channel.

The predetermined key may be a left key or a right key among four direction keys of the user operation unit, and the processor, in response to an up key or a down key among four direction keys of the user operation unit being selected, may change a channel to a direction corresponding to the selected key.

The processor may determine whether the selected application is installed, and in response to the selected application not being installed, control the display to display a UI which inquires whether to install the selected application, in response to an installation command of the selected application being input through the UI, download and install the selected application from outside, and execute the installed application.

The processor may determine a version of the selected application, in response to a version of the selected application not being a latest version, update the selected application to a latest version, execute the application which is updated to a latest version, and output an informing message which notifies that the selected application has been updated to a latest version.

Effects of the Invention

According to various embodiments described above, a user may convert a channel more conveniently and intuitively or execute an application by using four direction keys.

DETAILED DESCRIPTION

Figure 1:
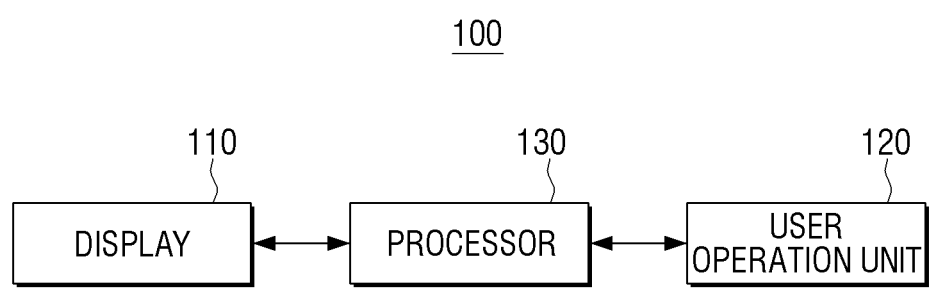
FIG. 1 is a block diagram illustrating a brief configuration of a display apparatus according to an embodiment.

Hereinafter, the terms used in exemplary embodiments will be explained briefly, and exemplary embodiments will be described in greater detail.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Therefore, the terms used in the exemplary embodiments should be defined based on the meaning thereof and the descriptions of the present disclosure, rather than based on their names only.

In the present disclosure, terms including an ordinal number such as 'first', 'second', etc. may be used to describe various components, but the components are not to be construed as being limited to the terms. The terms are only used to differentiate one component from other components. For example, the 'first' component may be named the 'second' component, and vice versa, without departing from the scope of the present disclosure. The term 'and/or' includes a combination of a plurality of items or any one of a plurality of terms.

Further, in the present disclosure, singular forms used in the specification are intended to include plural forms unless the context clearly indicates otherwise.

Further, it will be further understood that the terms "comprises" or "have" used in the present disclosure, specify the presence of stated features, numerals, steps, operations, components, parts mentioned in this specification, or a combination thereof, but do not preclude the presence or addition of one or more other features, numerals, steps, operations, components, parts, or a combination thereof.

Further, in the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

It will be understood that, when an element is mentioned as being "connected" to another element, the element may be "directly connected" to another element, and may be "electrically connected" to another element with an intervening element between the element and another element.

The term "user input" in the exemplary embodiments may include at least one of a touch input, a bending input, a deformation input, a voice input, a button input, and a multimodal input, but is not limited to these inputs.

Further, in the present disclosure, "application" may refer to a set of computer programs designed to perform a specific task. In the embodiments of the present disclosure, the application may be diverse. For example, the application may include a game application, a moving image replay application, a map application, a memo application, a calendar application, a phone book application, a broadcast application, an exercise support application, a payment application, a photo folder application, and the like, but is not limited these.

Unless indicated otherwise, it is to be understood that all the terms used in the disclosure including technical and scientific terms has the same meaning as those that are understood by those who skilled in the art. The terms defined in a generally used dictionary should be interpreted as having the same meanings as the contextual meanings of the relevant technology and should not be interpreted as having ideal or exaggerated meanings unless they are clearly defined in the various exemplary embodiments.

Hereinafter the exemplary embodiments will be described in greater detail with reference to the accompanying drawings. FIG. 1 is a block diagram illustrating a brief configuration of a display apparatus 100 according to an embodiment. As illustrated in FIG. 1, the display apparatus 100 may include a display 110, a user operation unit 120, and a processor 130. Here, the display apparatus 100 may be a smart TV, but it is merely an embodiment, and the display apparatus 100 may be implemented as various electronic apparatuses such as a smart phone, a tablet PC, a notebook PC, a desktop PC, a kiosk and the like.

The display 110 may output an image content. Especially, the display 110 may display a broadcast content of the first channel received from an external source (e.g., a broadcasting station). In addition, the display 110 may display at least one application related to the broadcast content of the first channel currently displayed and a UI for selecting a channel similar to the first channel.

The user operation unit 120 may receive a user command for controlling the display apparatus 100. Especially, the user operation unit 120 may be implemented as a remote controller, and in this case, the remote controller may include four direction keys.

The processor 130 controls overall operations of the display apparatus 100. Especially, while a broadcast content is displayed, if a predetermined key of the user operation unit 120 is selected, the processor 130 may determine at least one application related to the broadcast content, and control the display 110 to display the UI for selecting the determined at least one application.

Specifically, if the predetermined key (e.g., a left key or a right key among the four direction keys) of the user operation unit 120 is selected while a broadcast content is displayed, the processor 130 may determine at least one of at least one application related to the broadcast content currently displayed and the channel similar to the first channel. Here, the processor 130 may determine at least one application related to the broadcast content and the channel similar to the first channel by using pre-obtained channel map information. Here, the channel map information may be the information in which the information on a plurality of channels and the information on at least one application related to the plurality of channels and on a similar channel are mapped and stored. Here, the channel map information may be received from an external server, but it is merely an embodiment, and the display apparatus 200 may analyze channel information and the like and generate the channel map information.

In addition, the processor 130 may control the display 110 to display a UI for selecting at least one application related to the broadcast content currently displayed and the channel similar to the first channel. Here, the UI may include at least one application related to a plurality of channels arranged based on a first axis and related to the broadcast content arranged based on a second axis, and the channel similar to the first channel. In addition, in the UI, at least one application related to the broadcast content arranged based on the second axis and the channel similar to the first channel may be arranged based on a frequency of use, but it is merely an embodiment, and the at least one application and the channel similar to the first channel may be arranged based on the order of recommendation, order of popularity, order of name, and the like.

In addition, when the UI is displayed for the first time, the processor 130 may control the display 110 to display a highlight on the broadcast content currently displayed.

In addition, one of an up key and a down key of the user operation unit 120 is displayed while a highlight is displayed on the broadcast content, the processor 130 may control the display 110 to move the highlight to the direction corresponding to the selected key based on the first axis. In addition, if one of a right key and a left key is selected while a highlight is displayed on the broadcast content, the processor 130 may control the display 110 to move the highlight to the direction corresponding to the selected key based on the second axis.

In addition, if a user operation for selecting an application (e.g., an operation of selecting a confirm key of the user operation unit 120) is input while the highlight is positioned at the application, the processor 130 may execute the selected application and control the display 110 to display an execution screen of the application.

In addition, if a predetermined time passes after the channel currently broadcasted is changed to the second channel, the processor 130 may determine at least one application related to a broadcast content of the second channel and the channel similar to the second channel, and control the display 110 to change the UI to include at least one application related to the broadcast content of the second channel, and the channel similar to the second channel.

Meanwhile, if the left key or the right key of the user operation unit 120 is selected while the broadcast content is displayed, the processor 130 controls the display 120 to display the UI for selecting the application related to the broadcast content currently displayed or a similar channel, but if an up key or a down key among four direction keys of the user operation unit 120 is selected, the processor 130 may change the channel to the direction corresponding to the selected key.

Meanwhile, if an application is executed, the processor 130 may determine whether the application is installed and updated.

Specifically, the processor 130 may determine whether the selected application is installed. If it is determined that the selected application is not installed, the processor 130 may control the display 110 to display the UI which inquires whether to install the selected application. Subsequently, when the installation instruction of the selected application is input through the UI, the processor 130 may download the selected application from an outside and install the application, and execute the installed application.

The processor 130 may determine the version of the selected application. If it is determined that the version of the selected application is not the latest version, the processor 130 may update the selected application to the latest version, and execute the application which is updated to the latest version. In addition, the processor 130 may control the display 110 to display an informing message which notifies that the selected application has been updated to the latest version.

Through the display apparatus 100 according to an embodiment, a user may access the application related to the broadcast content currently displayed, and a similar channel more intuitively and conveniently.

Hereinafter the display apparatus will be explained in more detail with reference to FIGS. 2 to 9.

Figure 2:
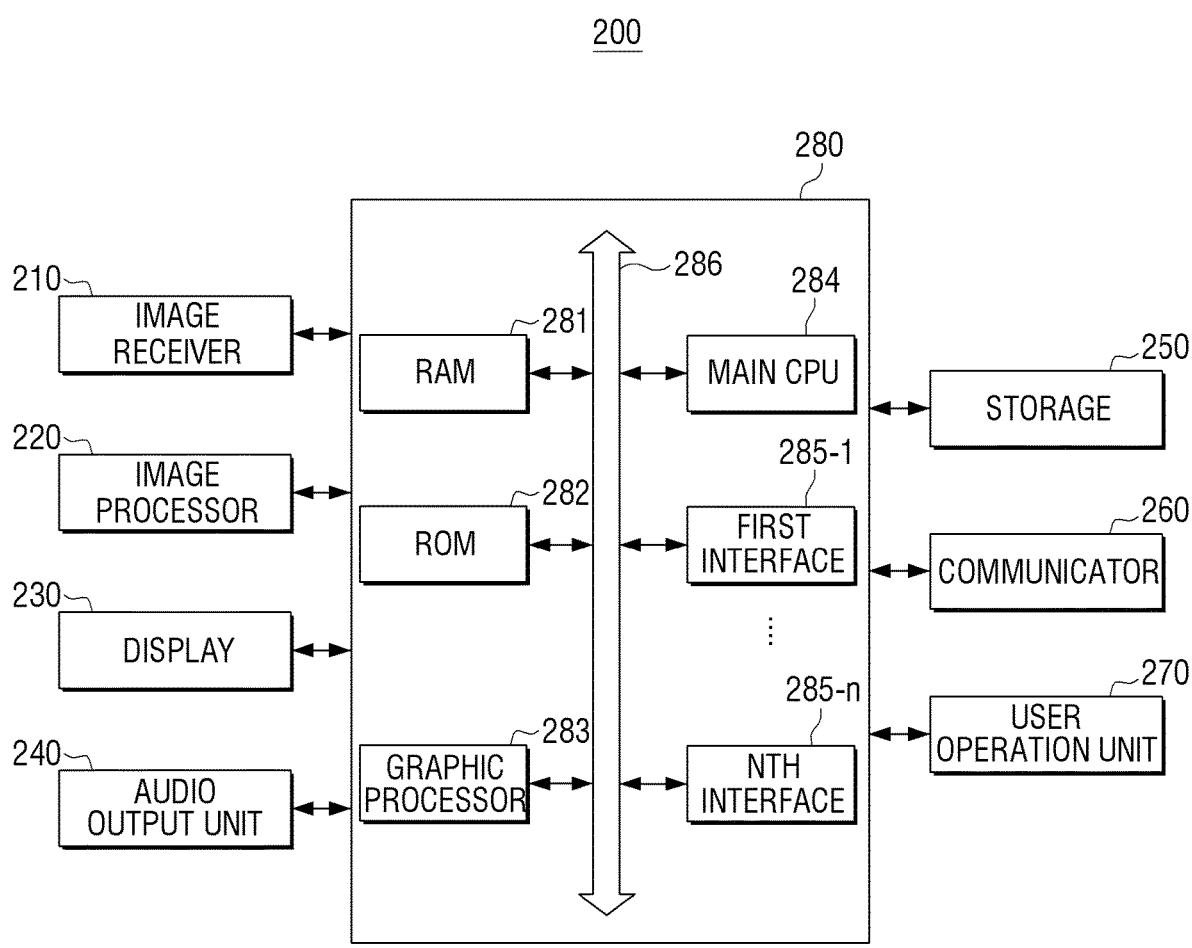
FIG. 2 is a block diagram illustrating a detailed configuration of a display apparatus according to an embodiment.

FIG. 2 is a block diagram illustrating a detailed configuration of a display apparatus 200 according to an embodiment. As illustrated in FIG. 2, the display apparatus 200 may include an image receiver 210, an image processor 220, a display 230, an audio output unit 240, a storage 250, a communicator 260, a user operation unit 270 and a processor 280.

Meanwhile, FIG. 2 illustrates the example in which the display apparatus 200 has various functions such as a display function, a broadcast content providing function, an application execution function and the like, and illustrates various types of elements synthetically. Accordingly, some of the elements illustrated in FIG. 2 may be omitted or changed, or other elements may be added according to an embodiment.

The image receiver 210 receives an image content from various sources of an outside. Especially, the image receiver 210 may receive a plurality of broadcast contents from an external broadcasting station. In addition, the image receiver 210 may receive various image contents from an external apparatus (e.g., a server, a DVD, etc.). Here, the image content may include various data such as image data, audio data, and subtitle data.

The image processor 220 is an element which processes the image data received by the image receiver 210. The image processor 220 may perform various image processings such as decoding, scaling, noise filtering, frame rate conversion, and resolution conversion on the image data.

The display 230 may display at least one of a video frame generated by the image processor 220 by processing the image data received from the image receiver 210, and various screens generated in the graphic processor 283.

Especially, the display 230 may display the broadcast content of the first channel among a plurality of broadcasting channels. In addition, if a predetermined key of the user operation unit 270 is selected, the display 230 may display the UI for selecting at least one related application or a channel similar to the first channel. Here, the UI arranges the plurality of channels based on the first axis, and arranges the application related to the broadcast content currently displayed or a similar channel based on the second axis.

The audio output unit 240 outputs various alarm sounds and voice messages in addition to various types of audio data processed in an audio processor (not illustrated). Especially, the audio output unit 240 may output various forms of informing messages (e.g., update informing message) in an audio form.

The storage 250 may store various modules for driving the display apparatus 200. For example, the storage 250 may store a software which includes a base module, a sensing module, a communication module, a presentation module, a web browser module, and a service module. Here, the base module is a basic module which processes a signal transmitted from each hardware included in the display apparatus 200 and transmits the processed signal to an upper layer module. The sensing module collects information from various sensors, and analyzes and manages the collected information, which may include a face recognition module, a voice recognition module, a motion recognition module, an NFC recognition module and the like. The presentation module is a module for composing a display screen, which may include a multimedia module for reproducing and outputting a multimedia content, and a UI rendering module which performs UI and graphic processing. The communication module is a module for communicating with an outside. The web browser module is the module which performs web browsing and accesses a web server. The service module includes various types of applications for providing various services.

Meanwhile, the storage 250 may be implemented to be non-volatile memory, volatile memory, flash memory, hard disk drive (HDD) or solid state drive (SSD). The storage 250 may be accessed by the processor 280, and reading/writing/revising/deleting/updating of data may be performed by the processor 280. The term 'memory' in an embodiment may include a storage 250, a read only memory (ROM) 282 and a Random Access Memory (RAM) 281 within the processor 280, or a memory card (not illustrated) mounted on the display apparatus 200 (e.g., micro SD card, memory stick).

In addition, the storage 250 may store a program and data for composing various types of screens to be displayed on a display area of the display 230.

As illustrated, the storage 250 may include various program modules, but some of the program modules may be omitted, modified, or added according to the type and feature of the display apparatus 200. For example, if the above described display apparatus 200 is implemented as a tablet PC, the base module may further include a determination module for determining the location based on GPS, and the sensing module may further include a sensing module for sensing an operation of a user.

The communicator 260 communicates with various types of external apparatuses according to various types of communication methods. The communicator 260 may include various communication chips such as a WiFi chip, a Bluetooth chip, a Near Field Communication (NFC) chip, a wireless communication chip, an IR chip, and so on. Here, the WiFi chip, the Bluetooth chip, NFC chip and/or the IR chip may perform communication according to a WiFi method, a Bluetooth method, an NFC method, and an IR method, respectively. Among the above chips, the NFC chip represents a chip which operates according to the NFC method which uses a 13.56 MHz band among various RF-ID frequency bands such as 135 kHz, 13.56 MHz, 433 MHz, 860-960 MHz, 2.45 GHz, and so on. When the WI-FI chip or the Bluetooth chip is used, various connection information such as SSID and session key may be exchanged first, communication may be connected by using the connection information, and then various information may be exchanged. The wireless communication chip represents a chip which communicates according to various communication standards such as IEEE, Zigbee, 3rd Generation (3G), 3rd Generation Partnership Project (3GPP), Long Term Evolution (LTE) and so on.

Especially, the communicator 260 may obtain an image content (e.g., a game content) from an external server. In addition, the communicator 260 may transmit information regarding a frequency element of an audio source to an external server, and receive type information of the audio source corresponding to the frequency element from the external server.

The user operation unit 270 receives various user commands for controlling the display apparatus 200. Here, the user operation unit 270 may be implemented as a remote controller which includes four direction keys, but it is merely an embodiment, and the user operation unit 270 may be implemented as various input apparatuses such as a pointing device which includes a motion sensor, a keyboard, a mouse, a motion input unit which includes a camera, a voice input unit which includes a microphone, and a touch sensor.

The processor 280 controls overall operations of the display apparatus 200 using various programs stored in the storage 250.

As illustrated in FIG. 2, the processor 280 may include, for example, a RAM 281, a ROM 282, a graphic processor 283, a main CPU 284, first to nth interfaces 285-1 to 285-n, and bus 286. Here, the RAM 281, the ROM 282, the graphic processor 283, the main central processing unit (CPU) 284, the first to n-th interfaces 285-1 to 285-n, and the like may be connected to each other via the bus 286.

The ROM 282 stores a command set, etc. for booting a system. When a turn on command is input and thus power is supplied, the main CPU 284 copies an operating system (O/S) stored in the storage 250 to the RAM 281 according to the command stored in the ROM 282 and executes the O/S to boot the system. When the booting of the system is completed, the main CPU 284 copies various types of application programs stored in the storage unit 250 into the RAM 281 and executes the application programs copied into the RAM 281 to perform various types of operations.

The graphic processor 283 may generate a screen including various types of objects, such as a pointer, an icon, an image, a text, etc., by using an operator (not illustrated) and a renderer (not illustrated). The operator uses the control command received from the input unit to operate attribute values, such as coordinate values, forms, sizes, and colors in which each object will be displayed according to a layout of the screen. The renderer may generate various layouts of screens including objects based on the attribute value calculated in the operation unit. The screen generated by the renderer is displayed in a display region of the display 240.

The main CPU 284 accesses the storage unit 250 to perform the booting by using the O/S stored in the storage unit 250. The main CPU 284 performs various types of operations by using various types of programs, contents, data, etc. stored in the storage 250.

The first to n-th interfaces 285-1 to 285-n are connected to the foregoing various components. One of the interfaces may be a network interface which is connected to an external apparatus via a network.

Hereinafter embodiments will be described in detail with reference to accompanying drawings. The processor 130 may obtain channel map information for generating a UI for selecting a channel or an application. Here, the channel map information is the information in which information on a plurality of channels, information on the application related to a broadcast content of the plurality of channels, or information on the channel similar to the plurality of channels are mapped and stored. Here, the similar channel may include a virtual channel in addition to the channels currently provided from a broadcasting station.

For example, the channel map information may map and store the information on a plurality of channels, information on the application related to a broadcast content of the plurality of channels, or information on the channel similar to the plurality of channels, in a form as shown in the table 1 below.

TABLE 1

| Channel No. | Channel Name | Broadcast program | Similar channel | Related application |
|---|---|---|---|---|
| 3 | AA home shopping | Chili Shrimp sales event | 5, 8 | AA shopping App, Cook App |
| 4 | BBB | World Cup Soccer | 13, 15, 17 | Soccer game App, World cup App |
| 5 | CC home shopping | Cell phone sales event | 3, 8 | CC shopping App, FF shopping App |
| 6 | DDD | Drama | 22, 23 | DDD App, Shopping App |
| 7 | EE education broadcast | English for university admission | 9 | Education broadcast App |

Especially, the similar channel included in the channel map information may be determined based on the channel corresponding to a currently displayed broadcast content, a channel name, name of the broadcast content currently broadcasted, and type, cast, producer of the broadcast content currently broadcasted. In addition, the related application included in the channel map information may be the application related to the broadcast content currently broadcasted.

Meanwhile, it has been described in Table 1 that only the channel number of a similar channel, the information on the application name of a related application are included in the channel map information, but it is merely an embodiment, and the channel map information may include the channel name of a similar channel, information on the broadcast content currently broadcasted (e.g., a cast, a producer, etc.), and a download address of a related application, etc.

In addition, the channel map information may be received from an external server through the communicator 260, but it is merely an embodiment, and the processor 280 may directly analyze and generate the channel map information through EPG information received from an outside.

In addition, the channel map information may be updated in real time according to a broadcast content currently broadcasted. In addition, the channel map information may be received from an external server in a predetermined period, but it is merely an embodiment, and the channel map information may be received when a predetermined event (e.g., a channel converting event, a power on event, etc.) is generated.

In addition, the channel map information may include the information on the frequency of use of a channel or an application. The information on the frequency of use of a channel or an application may be scored by determining a viewing time after a conversion. In addition, the channel or an application which has the highest score may be provided to a user first.

Figure 3A:
FIGS. 3A to 8 are views illustrating a UI provided by a display apparatus for selecting an application related to a currently displayed broadcast content or a similar channel according to various embodiments.

Meanwhile, the processor 280 may control the display 230 to receive and display the broadcast content of the first channel according to a user operation. For example, as illustrated in FIG. 3A, the processor 280 may control the display 230 to display a broadcast content screen 300 of a CC home shopping channel of channel number 5.

Figure 3B:
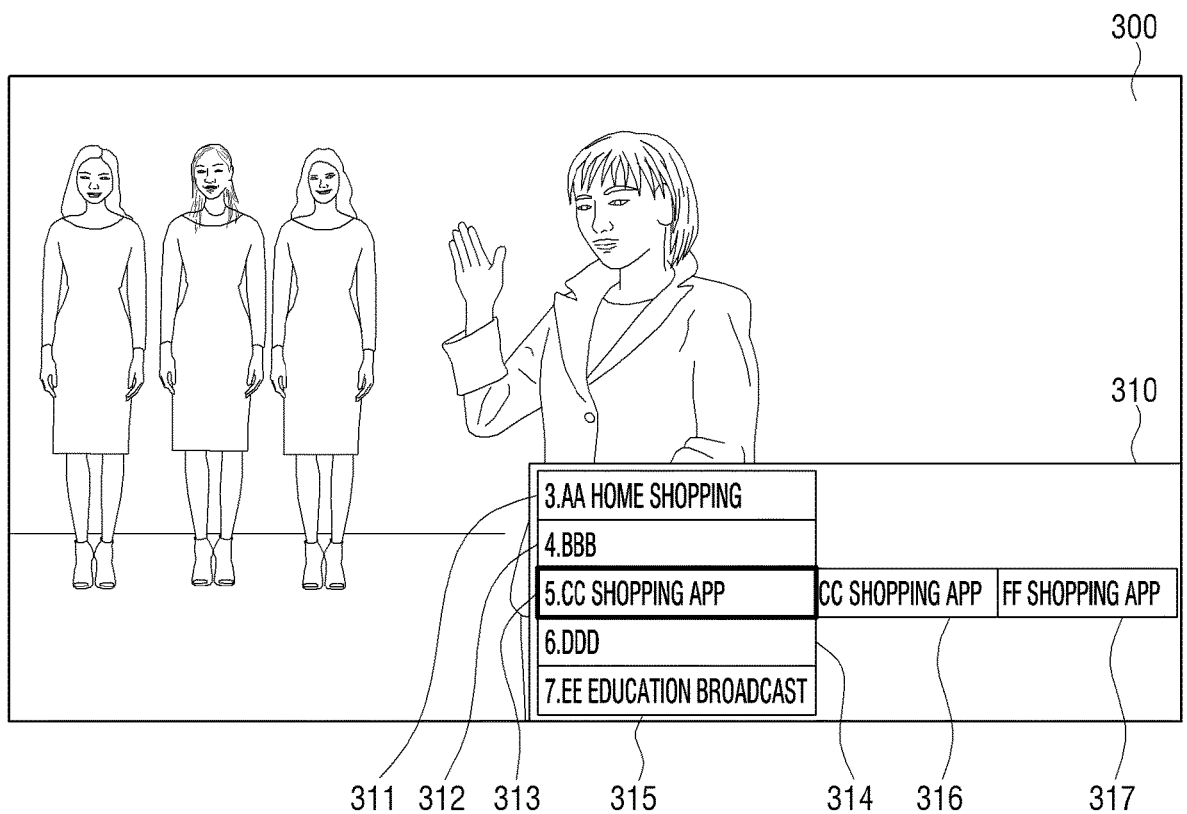
Figure 3C:
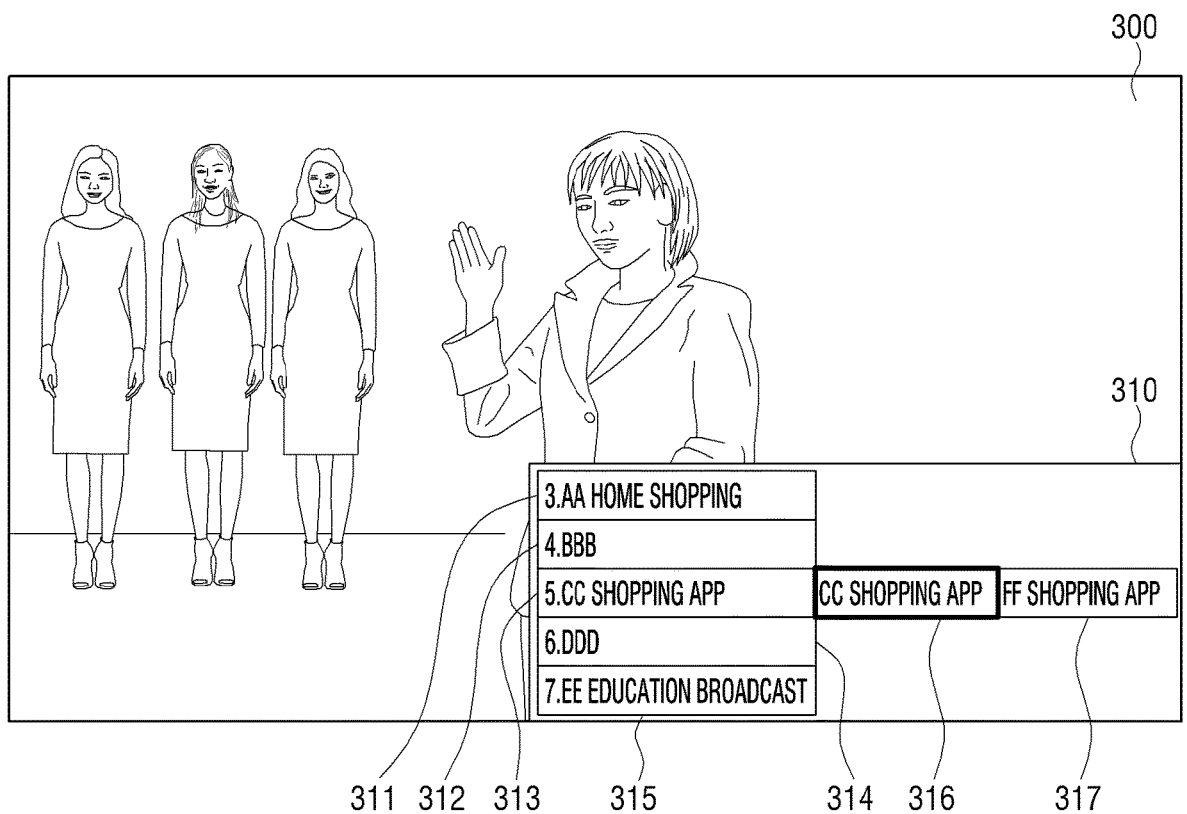

While the broadcast content screen 300 of a CC home shopping channel is displayed, if a user operation of selecting a predetermined key (e.g., a left key or a right key among four direction keys or a list generation key) of the user operation unit 270 is input, the processor 280 may control the display 230 to display the UI for selecting a plurality of channels or applications on one area (e.g., a right bottom area) of the broadcast content screen 300. For example, as illustrated in FIG. 3B, the processor 280 may control the display 230 to display the UI 310 in which a plurality of channels are arranged based on the first axis (a vertical axis) and applications related to a broadcast content currently displayed are arranged based on the second axis (a horizontal axis). Here, in the UI, an AA home shopping channel 311 of channel No. 3, a BBB channel 312 of channel No. 4, a CCC home shopping channel 313 of channel No. 5, a DDD channel 314 of channel No. 6, and an EE education broadcast 315 of channel No. 7 may be arranged based on the vertical axis, and a CC home shopping channel 313, a CC shopping application 316, and an FF shopping application 317 may be arranged based on the horizontal axis. Here, the plurality of channels arranged based on the horizontal axis may be arranged in the order of channel number. In addition, the related application arranged based on the vertical axis may be arranged in the order of frequency of use, but it is merely an embodiment, and the applications may be arranged in various types of orders such as the order of recommendation, order of population, order of name and the like.

In addition, the channel corresponding to a broadcast content currently displayed, among UIs, may be displayed in a method different from a different channel or application (e.g., a highlight). If the up key or the down key among four direction keys is selected while a UI 310 is displayed, the processor 280 may move the highlight based on the vertical axis. In addition, if the left key or the right key among four direction keys is selected while the UI 310 is displayed, the processor may move the highlight based on the horizontal axis.

For example, as illustrated in FIG. 3B, if the right key is selected for one time while the highlight is displayed on the CC home shopping channel 313 of the UI 310, the processor 280 may control the display 230 to display the highlight on the CC shopping application 316 by moving the highlight one block to the right based on the horizontal axis. While the highlight is positioned at the CC shopping application 316, the processor 280 may control the display 230 to display an execution informing message such as "if you push a confirm key, an application is executed." on one area of the broadcast content screen 300.

In addition, if a predetermined key (e.g., an OK key, an enter key) is selected while the highlight is displayed at the CC shopping application 316, the processor 280 may execute the CC shopping application. Here, the processor 280 may determine whether the CC shopping application is installed and whether the application is the latest version.

Figure 3D:
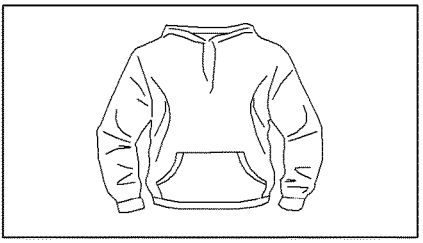
Figure 7:
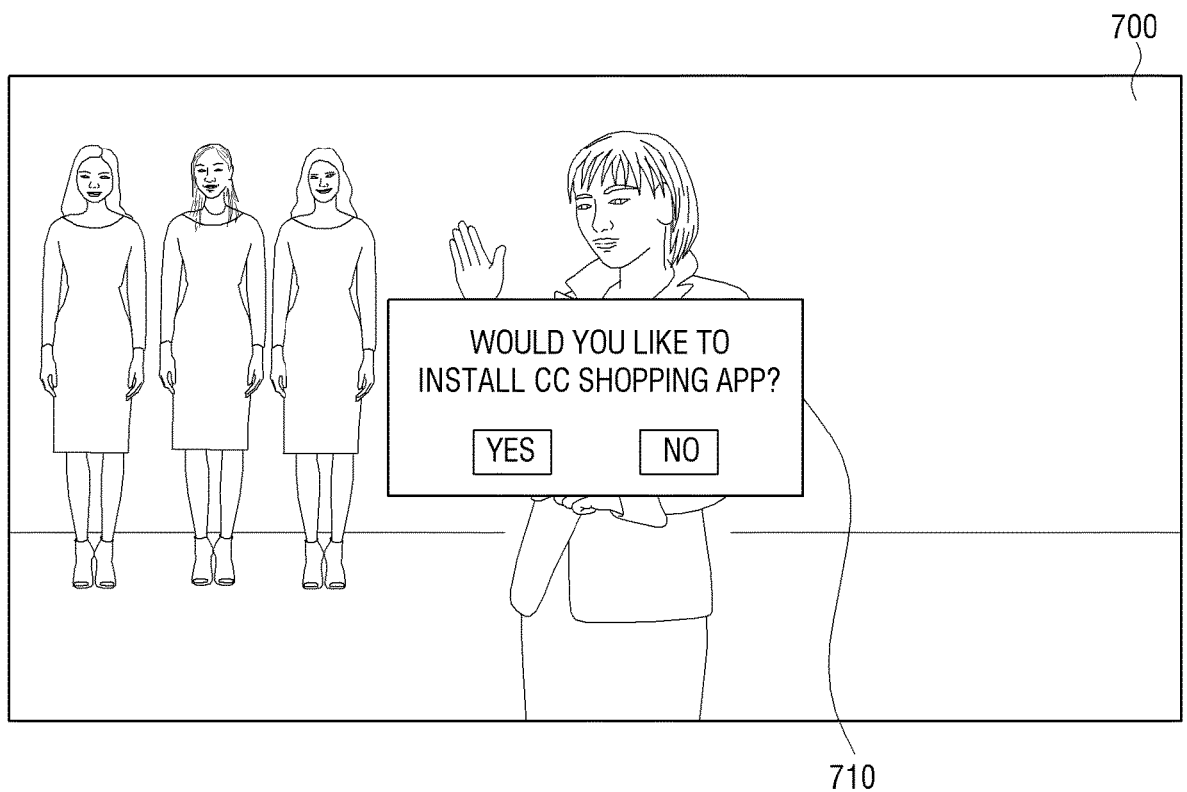

Specifically, after the execution command of the CC shopping application is input, the processor 280 may determine whether an execution data of the CC shopping application exists in the storage 250 and determine whether the CC shopping application is installed. If it is determined that the CC shopping application is not installed, the processor 280 may download the execution data of the CC shopping application based on installation address information of the CC shopping application included in the channel map information, and install the CC shopping application. Here, as illustrated in FIG. 7, the processor 280 may control the display 230 to display the message 710 which inquires whether to install the application before installing the CC shopping application. If the CC shopping application is installed, the processor 280 may control the display 230 to display the execution screen 320 of the CC shopping application by executing the CC shopping application as illustrated in FIG. 3D. Meanwhile, if the CC shopping application is executed, the processor 280 may control the display 230 to display an execution screen of the application.

Figure 8:
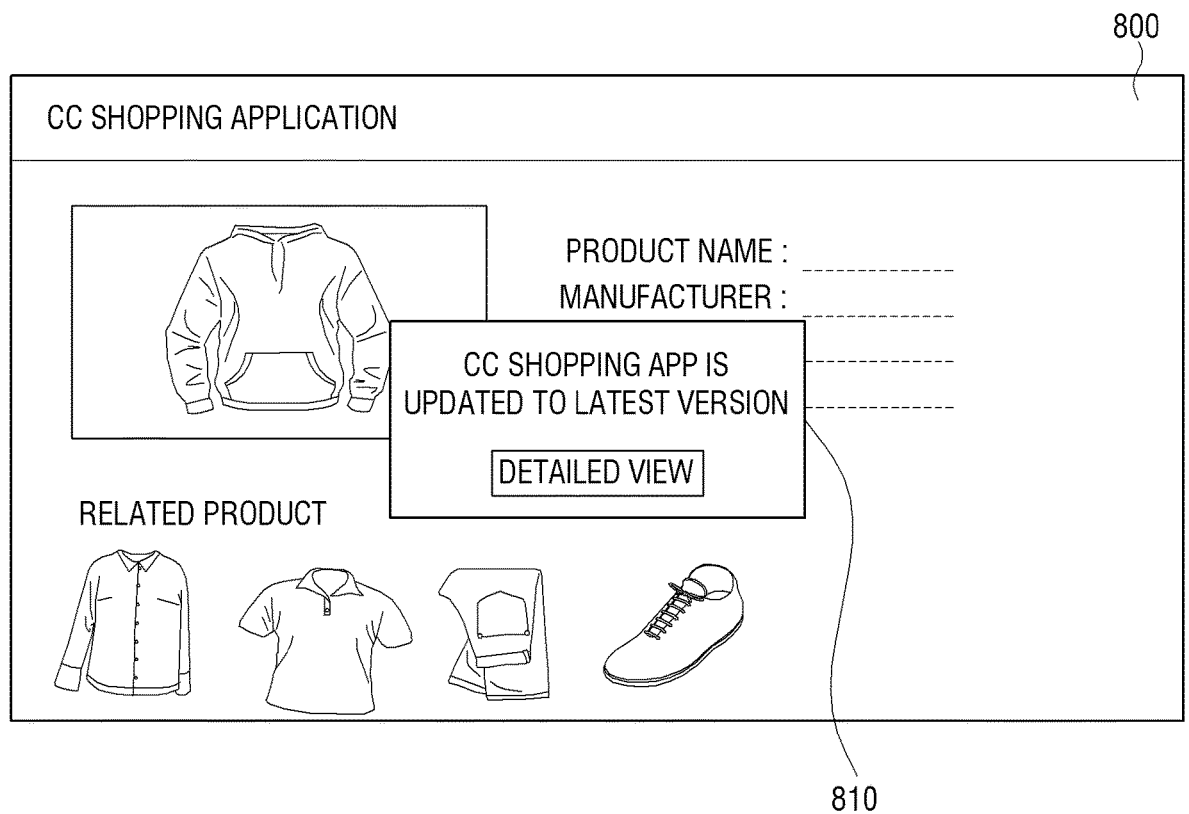

In addition, if it is determined that CC shopping application is installed, the processor 280 may determine whether the execution data of the currently installed CC shopping application is the latest version. If it is determined that the execution data of the CC shopping application is not the latest version, the processor 280 may download the latest version execution data of the CC shopping application based on the update address information of the CC shopping application included in the channel map information, and update the CC shopping application. In addition, as illustrated in FIG. 3D, the processor 280 may control the display 230 to display the execution screen 320 of the CC shopping application by executing the latest version of the CC shopping application. Here, as illustrated in FIG. 8, the processor 280 may control the display 230 to display the message 810 which informs update news of the application.

Meanwhile, it has been described that the application related to the currently displayed broadcast content is displayed based on the horizontal axis of the UI 310 in FIGS. 3A to 3D, but it is merely an embodiment, and the technical idea of the present embodiment may be applied to another embodiment.

Figure 4:
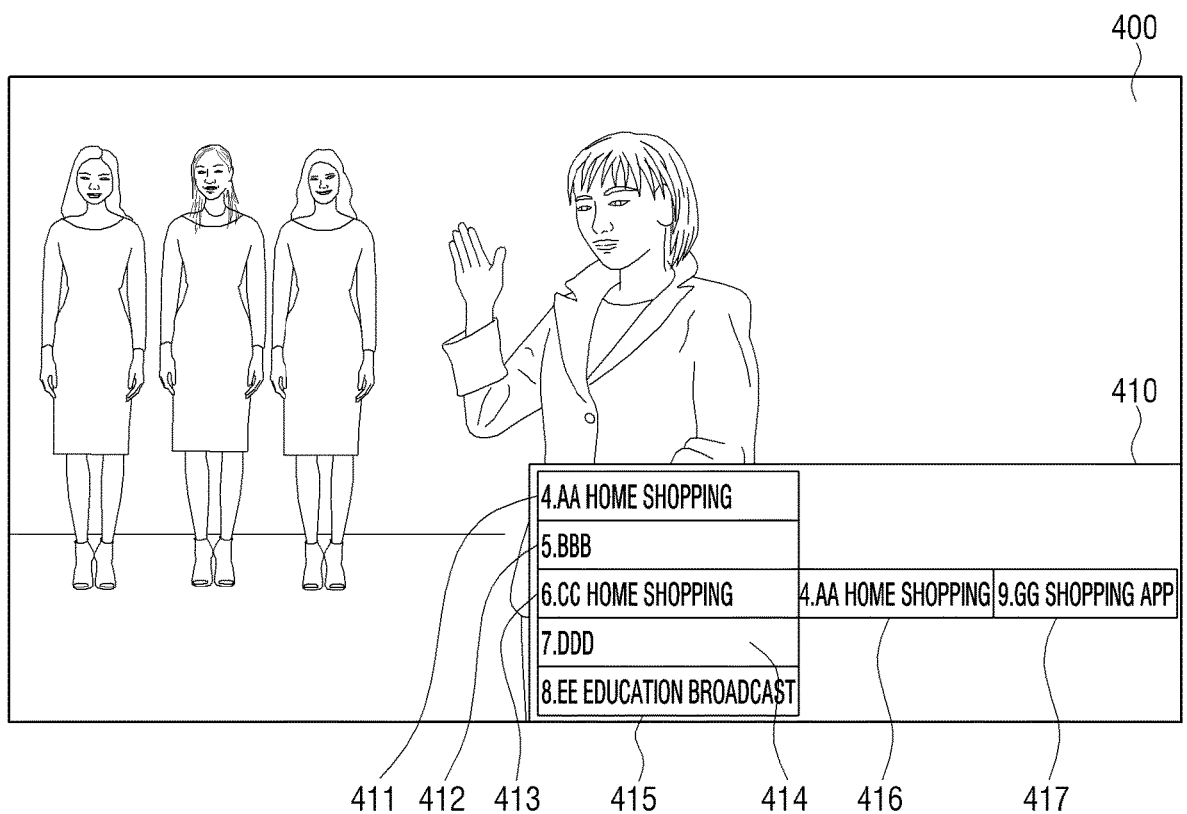

As illustrated in FIG. 4 according to another embodiment, the channel similar to the channel corresponding to the broadcast content currently displayed may be displayed on the horizontal axis. For example, the CC home shopping channel 413, the AA home shopping channel 416, and the GG home shopping channel 417 which are the channels of the currently displayed broadcast content may be arranged based on the horizontal axis. Here, the similar channels arranged based on the horizontal axis may be arranged according to the frequency of use.

Figure 5:
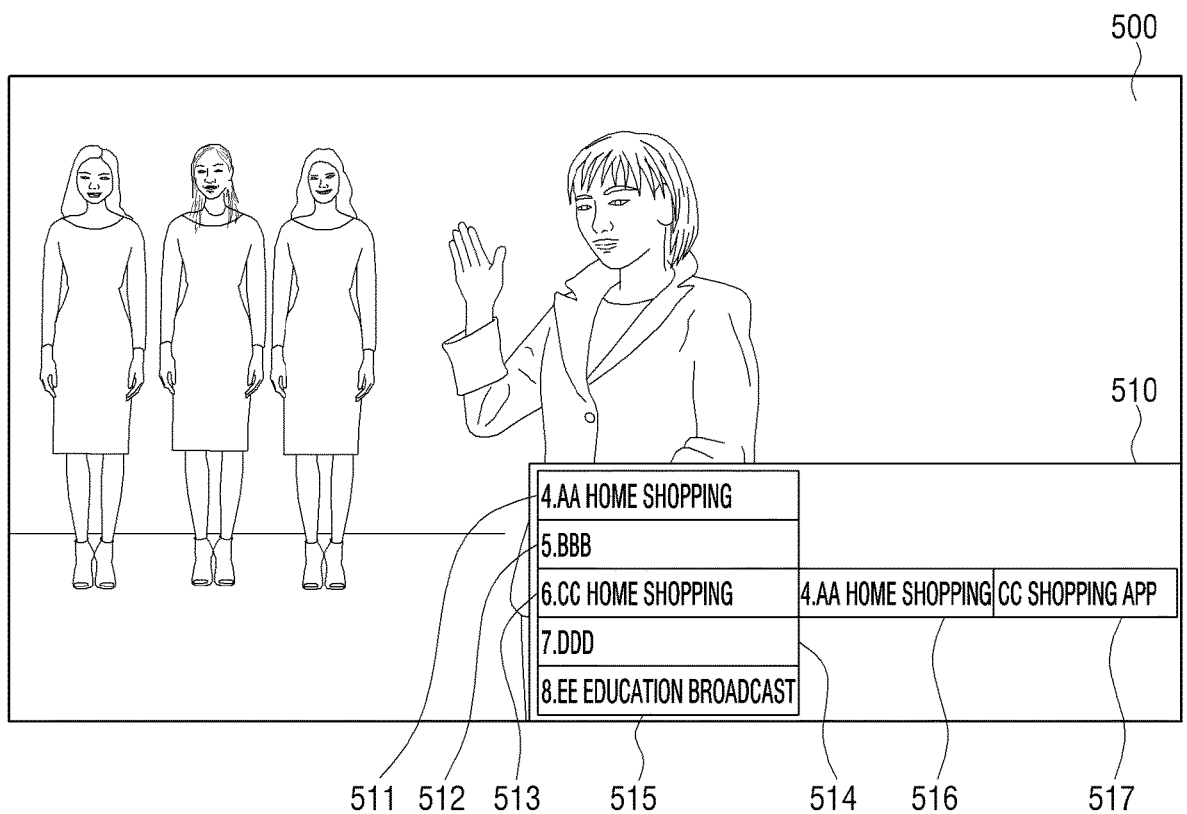

In addition, according to another embodiment, as illustrated in FIG. 5, the application related to the currently displayed broadcast content, and the channel similar to the channel corresponding to the currently displayed broadcast content may be displayed together on the horizontal axis. For example, the CC home shopping channel 513, the AA home shopping channel 516, and the CC shopping application 517 which are the channels of the broadcast content currently displayed, may be arranged based on the horizontal axis. Here, in the case of the similar channel or related applications displayed on the basis of the horizontal axis, the similar channels may be arranged first, and then related applications may be arranged.

Figure 6:
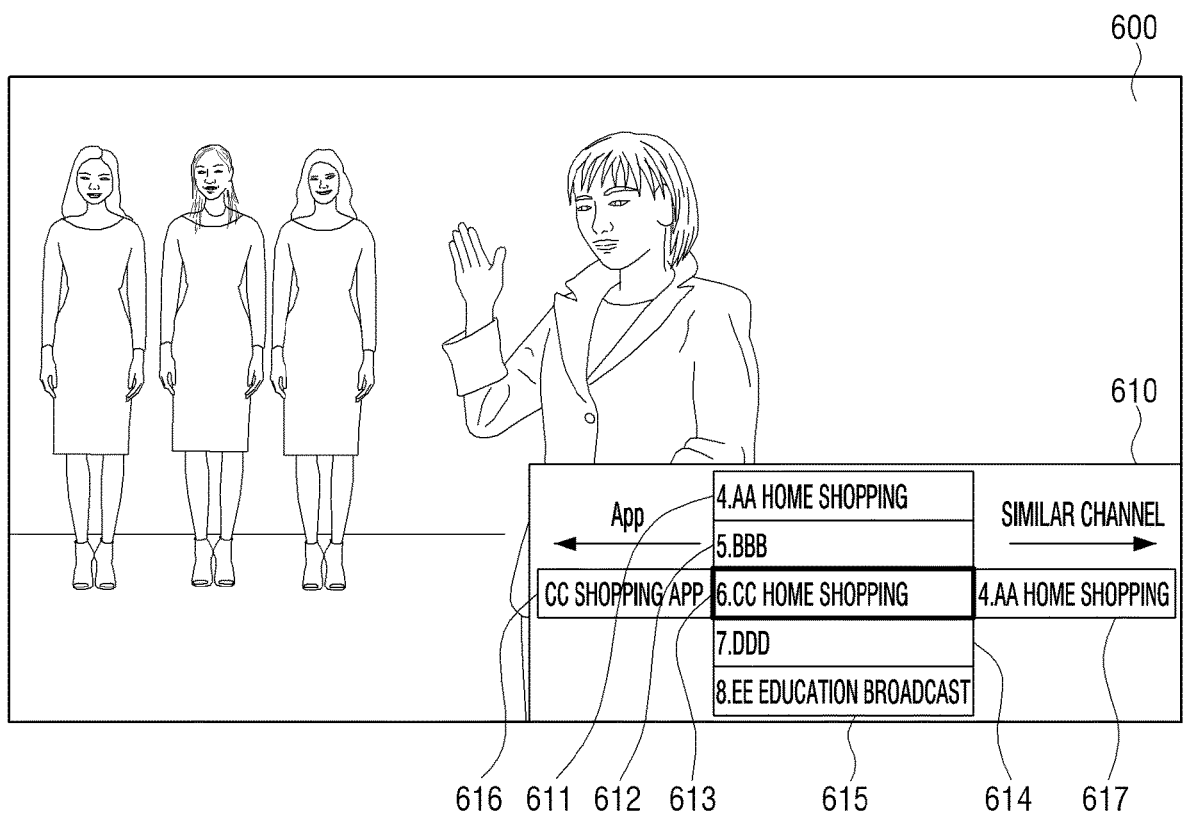

Meanwhile, in FIG. 3A to FIG. 5, a similar channel or a related application is displayed only in one direction (e.g., right) based on the horizontal axis, but it is merely an embodiment, and as illustrated in FIG. 6, the similar channel or a related application may be displayed in both directions based on the horizontal axis. Here, the related applications may be arranged at the left side based on the currently displayed broadcast program, and the similar channels may be arranged at the right side.

In addition, if a predetermined time passes after the channel currently broadcasted through a UI is changed to the second channel, the processor 280 may determine at least one application related to the broadcast content of the second channel and the similar channel of the second channel, and may change the UI to include at least one application related to the broadcast content of the second channel and the similar channel of the second channel. For example, if a predetermined time (e.g., twenty seconds) passes after the currently displayed channel is changed to channel No. 7, the processor 280 may determine the application related to the broadcast content currently broadcasted on channel No. 7 and the channel similar to the channel No. 7 based on the channel No. 7.

In addition, if a left key or a right key among the four direction keys is selected, the processor 280 may control the display 230 to display the UI 310 on the broadcast content screen 300 currently displayed, as illustrated in FIG. 3B. In addition, if an up key or a down key among four direction keys is selected, the processor 280 may convert the channel to the direction corresponding to the selected key.

Figure 9:
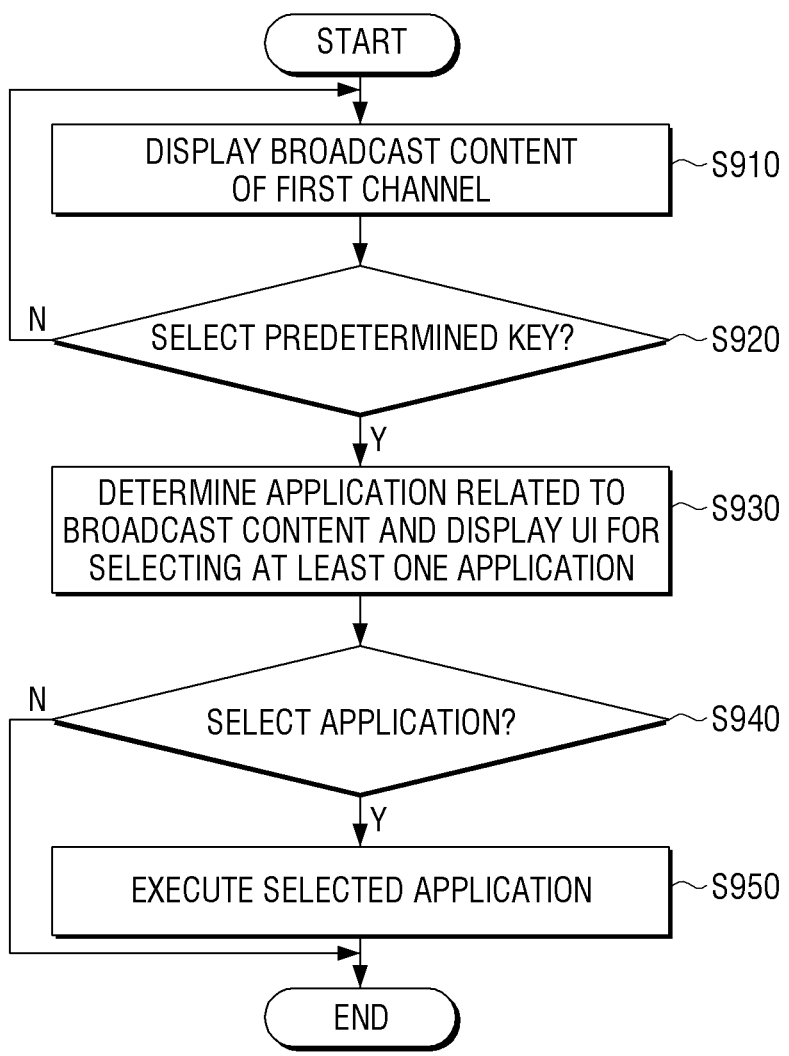
FIG. 9 is a flowchart illustrating a controlling method of a display apparatus according to an embodiment.

FIG. 9 is a flowchart illustrating a method for controlling a display apparatus 100 according to an embodiment.

First, the display apparatus 100 displays a broadcast content of the first channel in S910.

In addition, the display apparatus 100 determines whether a predetermined key is selected in S920. Here, the predetermined key may be a left key or a right key among four direction keys, but it is merely an embodiment, and the predetermined key may be realized as another key (e.g., UI generation key, etc.).

If the predetermined key is selected in S920-Y, the display apparatus 100 determines the application related to a broadcast content, and display the UI for selecting at least one determined application in S930. Here, a plurality of channels are arranged based on the first axis, and at least one application related to the broadcast content currently displayed may be arranged based on the second axis.

In addition, the display apparatus 100 determines whether one of at least one application is selected, in S940.

If an application is selected in S940-Y, the display apparatus 100 executes the selected application in S950.

According to the above various embodiments, a user may execute the application related to a broadcast content currently displayed and convert a channel to a similar channel more intuitively and conveniently by using four direction keys.

Meanwhile, the controlling method of a display apparatus according to the above-described various exemplary embodiments may be realized as a program and provided in a display apparatus or an input apparatus. In particular, the program including a method for controlling a display apparatus according to exemplary embodiments may be stored in a non-transitory computer readable medium and provided therein.

The non-transitory computer readable medium is not a medium that stores data for a short moment such as a register, a cash and a memory and the like, but a medium that stores data semipermanently and which is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing exemplary embodiments are merely exemplary and are not to be construed as limiting the present disclosure. The present disclosure can be readily applied to other types of apparatuses. Also, the description of exemplary embodiments is intended to be illustrative, and not to limit the scope of the claims and their equivalents, and many alternatives, modifications, and variations will be apparent to those skilled in the art.

What is claimed is:

1. A controlling method of a display apparatus comprising:

displaying a broadcast content of a first channel;

based on receiving a user command while the broadcast content is displayed, determining an application related to the broadcast content and a second channel related to the first channel, and displaying a user interface (UI) comprising the application and the second channel wherein the UI comprises a plurality of channels comprising the first channel arranged based on a first axis and the application and the second channel arranged based on a second axis which is perpendicular to the first axis; and based on the application included in the UI being selected, executing the selected application, wherein one of the application and the second channel is arranged in front of another one of the application and the second channel, and wherein the one of the application and the second channel is arranged in a left side and the other one of the application and the second channel is arranged in a right side based on the first channel on the second axis.

2. The controlling method as claimed in claim 1, wherein the application related to the broadcast content and the second channel related to the first channel are arranged based on frequency of use.

3. The controlling method as claimed in claim 1, wherein the display apparatus comprises a user operating unit which includes four direction keys, the method comprising:

in response to one of an up key and a down key being selected while a highlight is displayed on the broadcast content among the UI, moving the highlight to a direction corresponding to the selected key based on the first axis, and in response to one of a left key and a right key being selected while the highlight is displayed on the broadcast content among the UI, moving the highlight to a direction corresponding to the selected key based on the second axis.

4. The controlling method as claimed in claim 1, comprising:

in response to a predetermined time passing after a channel currently broadcasted through the UI is changed to the second channel, determining at least one application related to a broadcast content of the second channel and a channel similar to the second channel; and changing the UI to include at least one application related to a broadcast content of the second channel and a channel similar to the second channel.

5. The controlling method as claimed in claim 3,
the controlling method comprising:

in response to the up key or the down key among four direction keys being selected, changing a channel to a direction corresponding to the selected up key or the selected down key.

6. The controlling method as claimed in claim 1, wherein the executing comprises:

determining whether the selected application is installed;

in response to the selected application not being installed, displaying a UI which inquires whether to install the selected application;

in response to an installation command of the selected application being input through the UI, downloading and installing the selected application from an external source; and executing the installed application.

7. The controlling method as claimed in claim 1, wherein the executing further comprises:

determining a version of the selected application;
in response to a version of the selected application not being a latest version, updating the selected application to the latest version;
executing the application which is updated to the latest version; and
outputting an informing message which notifies that the selected application has been updated to the latest version.

8. A display apparatus comprising:
a display configured to display a broadcast content of a first channel;
a user operation unit configured to include four direction keys; and
a processor configured to,
   based on receiving a user command while the broadcast content is displayed, determine an application related to the broadcast content and a second channel related to the first channel, control the display to display a UI comprising the application and the second channel wherein the UI comprises a plurality of channels comprising the first channel arranged based on a first axis, and the application and the second channel arranged based on a second axis which is perpendicular to the first axis, and
   based on the application included in the UI being selected, execute the selected application,
wherein one of the application and the second channel is arranged in front of another one of the application and the second channel, and
wherein the one of the application and the second channel is arranged in a left side and the other one of the application and the second channel is arranged in a right side based on the first channel on the second axis.

9. The display apparatus as claimed in claim 8, wherein the application related to the broadcast content and the second channel related to the first channel are arranged based on frequency of use.

10. The display apparatus as claimed in claim 8,
wherein the processor, in response to one of an up key and a down key being selected while a highlight is displayed on the broadcast content among the UI, controls the display to move the highlight to a direction corresponding to the selected key based on the first axis, and in response to one of a left key and a right key being selected while the highlight is displayed on the broadcast content among the UI, controls the display to move the highlight to a direction corresponding to the selected key based on the second axis.

11. The display apparatus as claimed in claim 8, wherein the processor,
in response to a predetermined time passing after a channel currently broadcasted through the UI is changed to the second channel, determines at least one application related to a broadcast content of the second channel and a channel similar to the second channel, and
controls the display to change the UI to include at least one application related to a broadcast content of the second channel and a channel similar to the second channel.

\* \* \* \* \*